No. 778,537. PATENTED DEC. 27, 1904.
G. W. FEWGET.
NUT LOCK.
APPLICATION FILED MAY 24, 1904.
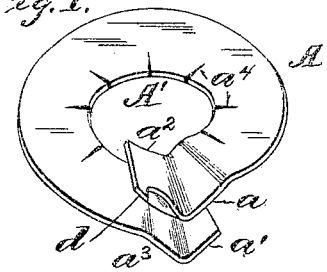
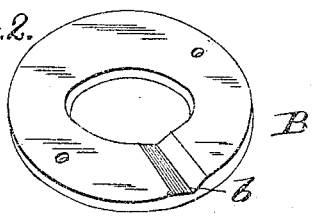
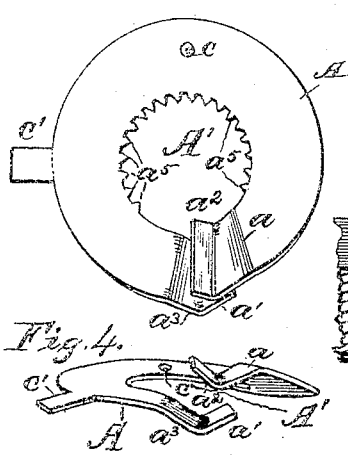
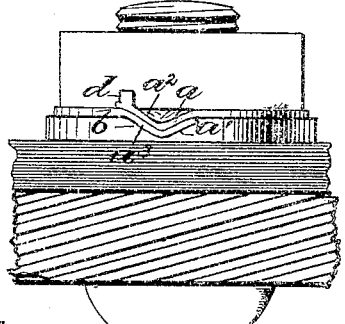
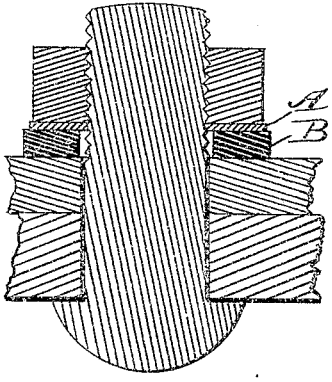
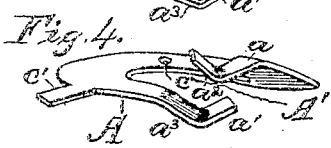
Witnesses
C. Edgar Webb.
Theo C. Johnson.
Inventor
George Washington Fewget.
By Eugene W. Johnson.
Attorney No. 778,537. Patented December 27, 1904.

UNITED STATES PATENT OFFICE.

GEORGE WASHINGTON FEWGET, OF GOLDFIELD, COLORADO, ASSIGNOR OF TWO-FIFTHS TO IVORY E. SMITH, OF GOLDFIELD, COLORADO.

NUT-LOCK.

SPECIFICATION forming part of Letters Patent No. 778,537, dated December 27, 1904.

Application filed May 24, 1904. Serial No. 209,470.

*To all whom it may concern:*

Be it known that I, GEORGE WASHINGTON FEWGET, a citizen of the United States, residing at Goldfield, in the county of Teller and State of Colorado, have invented new and useful Improvements in Nut-Locks, of which the following is a specification.

This invention is designed to provide means for securing nuts to bolts, and embraces a resilient spiral washer having overlapping ends and inclined contacting-faces, whereby when the ends of the lock-washer are brought together the internal diameter of the washer will be diminished to embrace the threads of the bolt and hold the washer against rotary movement thereon, such washer being also provided with means which engage with the nut and prevent turning thereof.

In the accompanying drawings, Figure 1 is a perspective view of a washer made in accord with my invention. Fig. 2 is a perspective view showing the washer adapted to be used in connection with the lock-washer shown in Fig. 1. Fig. 3 is a plan view showing one modification of my invention, the lock-washer having means for connecting the same with one of the parts to be connected by the bolt and a tongue or spur which can be bent to engage the nut. Fig. 4 is a side elevation of a modified form of the structure shown in Fig. 3. Fig. 5 is a side elevation, Fig. 6 a sectional view, and Fig. 7 a side elevation, of a modified form, the lock-washer being made from a bar rather than from a plate.

The salient feature of my invention comprises a washer which is developed from a spiral and provided with overlapping ends having parallel and inclined faces which when brought together with force contract the internal diameter of the lock-washer and cause the inner edge to embrace the threads of the bolt to hold the washer against rotation independent of the bolt. The construction also provides means whereby the nut may be canted by reason of the double thickness of the washer caused by its overlapping ends, which canting will to a great extent assist in holding the nut against rotation.

The salient features of my invention may be embodied in washers of various configurations, and the thickness of the lock-washer may be varied from a plate to a bar, and for fish-plates and such uses the fish-plate may be grooved to coact with the lock-washer.

A refers to the lock-washer in one of its forms, the same being developed from a spiral or helicoidal plate of such length that the ends will overlap, such ends having inclined faces $a$ and $a'$ and in many instances inclined faces $a^2$ and $a^3$. In the embodiment shown the inclined portions converge to or diverge from the center, and the apices are out of line vertically with each other, so that when pressure is brought to bear on opposite faces of the washer the inclined and converging surfaces will ride upon each other, resulting in a contraction of the opening, so that the inner edge of the washer will engage, clamp, or enter the surface of the bolt and hold the washer against movement independent of the bolt. The opening $A'$ through the washer originally is approximately very slightly larger than the diameter of the bolt, and there may be present a plurality of slits, as $a^4$, or inwardly-projecting teeth $a^5$, the slits being for the purpose of permitting the washer to be more readily contracted and the teeth when present to more securely engage the bolt than a plain surface.

B refers to a washer or plate of any suitable construction or shape, which washer may have means for connecting the same to one of the parts to be connected to hold the same against rotation, and this washer is provided with a recess $b$ to receive one of the ends of the lock-washer A.

In the development shown in Fig. 3 a lock-washer A of the plate type may have a perforation or spur $c$ to attach the same to one of the parts that are to be connected by the bolt and nut, and there may also be present a spur $c'$, which can be bent to engage the side of a nut. In Fig. 7 the lock-washer is shown as made from a bar, so that the overlapping ends will be drawn together by pressure on opposite faces, and when brought together the faces of the washer will be in the same plane. In Figs. 1 and 5 of the drawings the upper or outer end is shown as provided with a slit, so that the portion d at the corner may be bent upward to engage the side of the nut.

Having thus set forth my invention, I do not wish to be limited to the particular form or forms illustrated, as various forms may be used in practically carrying out my invention.

I claim—

1. A nut-locking washer, consisting of a split ring having at its respective ends inclined interengaging portions; whereby on compression the washer is contracted upon the bolt and means for preventing relative rotation of the nut and washer.

2. A nut-locking washer, consisting of a partially-divided helicoidal washer the overlapping ends having parallel inclined surfaces which when pressed into engagement effect a contraction of the washer upon the bolt and means for preventing relative rotation of the nut and washer.

3. A nut-locking washer, consisting of a resilient spiral washer having at its ends reversed inclined interlocking faces which when brought in interengagement by compression effect a contraction of the washer upon a bolt, and means for preventing relative rotation of the nut and washer.

4. A spiral or helicoidal nut-locking washer having overlapping ends with reversely-inclined interengaging portions which when brought into engagement effect a contraction of the washer upon a bolt and means carried by the washer which engages with the nut to prevent rotation thereof.

5. In a nut-lock a resilient spiral washer having overlapping ends with reversely-inclined interengaging portions, means for bringing the apices of said inclined portions together to effect a contraction and clamping of the lock-washer upon a bolt, means carried by the lock-washer for engagement with the nut to prevent rotation thereof and a washer having a depression in one of its faces, substantially as shown.

In testimony whereof I have affixed my signature in the presence of two subscribing witnesses.

GEORGE WASHINGTON FEWGET.

Witnesses:
GERALDINE S. KERIN,
W. E. DRISCOLL.